United States Patent
Ricci

(10) Patent No.: US 7,313,358 B1
(45) Date of Patent: Dec. 25, 2007

(54) COMMUNICATION SYSTEM FOR REDIRECTING COMMUNICATION WITH RADIO FREQUENCY DEVICES

(76) Inventor: Christopher P Ricci, 62 Farmside Dr., Pembroke, MA (US) 02359

( * ) Notice: Subject to any disclaimer, the term of this patent is extended or adjusted under 35 U.S.C. 154(b) by 224 days.

(21) Appl. No.: 10/165,558

(22) Filed: Jun. 8, 2002

(51) Int. Cl.
*H04K 3/00* (2006.01)
*H04M 3/42* (2006.01)

(52) U.S. Cl. ................... 455/1; 455/300; 455/412.1; 455/414.1; 455/417; 379/201.01; 379/211.01

(58) Field of Classification Search ............... 455/1, 455/300, 414.1, 417; 379/201.01, 211.01
See application file for complete search history.

(56) References Cited

U.S. PATENT DOCUMENTS

| | | | | |
|---|---|---|---|---|
| 6,002,944 A | * | 12/1999 | Beyda | 455/554.1 |
| 6,519,262 B1 | * | 2/2003 | Stephens et al. | 370/442 |
| 6,580,372 B1 | * | 6/2003 | Harris | 340/686.6 |
| 6,690,657 B1 | * | 2/2004 | Lau et al. | 370/315 |
| 6,993,360 B2 | * | 1/2006 | Plahte et al. | 455/555 |
| 2002/0028675 A1 | * | 3/2002 | Schmutz et al. | 455/424 |
| 2002/0098855 A1 | * | 7/2002 | Hartmaier et al. | 455/466 |
| 2002/0102968 A1 | * | 8/2002 | Arend et al. | 455/414 |
| 2002/0123306 A1 | * | 9/2002 | Masoian | 455/7 |
| 2003/0040280 A1 | * | 2/2003 | Koskelainen | 455/67.1 |
| 2003/0064711 A1 | * | 4/2003 | Gilbert et al. | 455/414 |
| 2003/0158613 A1 | * | 8/2003 | Chen | 700/94 |

* cited by examiner

*Primary Examiner*—Duc M. Nguyen
*Assistant Examiner*—Matthew Genack

(57) ABSTRACT

A communication system that intercepts incoming radio signals and transmits a second signal notifying the user that a radio signal has been intercepted. The communication does so by using an interference generator that is passive, such as a shield, or active, such as destructive interference generators to create a zone in which the radio device does not receive the original incoming radio signal. Using an antenna located outside that zone, a registrar then intercepts incoming signals and notifies the user of the communication using a user-defined method. For example, the incoming signal can be rerouted to a landline or a paper message can be generated and delivered to the user.

19 Claims, 2 Drawing Sheets

COMMUNICATION SYSTEM FOR REDIRECTING COMMUNICATION WITH RADIO FREQUENCY DEVICES

BACKGROUND OF THE INVENTION

The present invention relates generally to an apparatus and method for radio frequency communication. More particularly, the invention relates to methods and apparatus for isolating radio frequency communication devices and diverting the communication to more acceptable locations.

Since the advent of radio, people have been disturbed by other people's use of such devices. The use of early AM radios were no doubt restricted to low volumes in certain settings. As portability increased, so did the settings in which these devices were viewed with disdain. Boom boxes are not allowed, or at least discouraged, from use in various venues.

In recent years, a new form of communication device has taken center stage—the cellular telephone ("cell phone"). By this time, millions of people in the United States and around the world use cellular phones. One of the most interesting things about a cell phone is that it is actually a radio—an extremely sophisticated radio, but a radio nonetheless.

With the popularity of cell phones increasing, their use in public areas is also increasing. Use in restaurants and elevators, for example, is looked at with contempt by some, but usually not restricted.

Pagers are another wireless device that has seen a surge in popularity recently. Unlike cell phones, their ability to disturb is generally restricted to the audible alert that can accompany a page. However, like cell phones their alerts in the wrong environment can be disconcerting. For example, when they ring in a courtroom, a theater, or a library, the disturbance is substantial.

Likewise, other personal communicators such as personal digital assistants (PDAs), portable email devices and the like are performing more and more wireless communications, most also including an audible alert capability.

Requiring that these devices be disabled in certain environments is currently the best method of stopping these problems. However, in the case of an emergency, this is potentially dangerous where the user is now no longer easily reachable. For example, a doctor would no longer be available to receive a page from a hospital. Further, it requires that the users comply with the request.

There are still other forms of communication devices which have had their use questioned. Various consumer information devices are incorporating a communication standard known as Bluetooth. This, inter alia, allow the devices to communicate with other surrounding Bluetooth devices. Airlines have raise safety concerns over the inability to stop these devices from communicating and their potential for interference with aircraft electronics.

In order to best understand the invention with respect to the common example used herein, some basics of a cellular telephone system must be understood. For that purpose, a prior art cellular system 10 is described in FIG. 1. The cellular system 10 divides a city into small cells. This allows extensive frequency reuse across a city. Because cell phones 12 and base stations 18 use low-power transmitters, the same frequencies can be reused in non-adjacent cells.

Each cell has a base station 18 that consists of a tower 14 and a small building 17 containing the radio equipment 17.

Each cell phone uses two frequencies per call—a duplex channel—so in an analog system, each carrier typically has 395 voice channels and another 42 frequencies for control channels. With digital transmission methods, the number of available channels increases. An analog system will be described, for the purpose of simplicity, though one skilled in the art will realize that the invention works equally with a digital system.

The cellular approach requires a large number of base stations 18 in a city of any size. Each carrier in each city also runs one central office called the Mobile Telephone Switching Office (MTSO) 20. This office 20 handles all of the phone connections to the normal land-based phone system 22, and controls all of the base stations 18 in the region.

All cell phones 12 have special codes associated with them. These codes are used to identify the phone, the phone's owner and the service provider. The cell phone codes are the following:

Electronic Serial Number (ESN)—a unique 32-bit number programmed into the phone when it is manufactured Mobile Identification Number (MIN)—a 10-digit number derived from the user's phone's number System Identification Code (SID)—a unique 5-digit number that is assigned to each carrier by the FCC While the ESN is considered a permanent part of the phone 12, both the MIN and SID codes are programmed into the phone 12 when a user purchases a service plan and have the phone activated.

When a user turns on the cell phone 12 and someone tries to call the user, the following occurs:

a. When the user first powers up the phone 12, the phone 12 listens for an SID on the control channel. The control channel is a special frequency that the phone 12 and base station 18 use to talk to one another about things like call set-up and channel changing. If the phone 12 cannot find any control channels to listen to, it knows it is out of range and displays a "no service" message.

b. When the phone 12 receives the SID, the phone 12 compares it to the SID programmed into the phone 12. If the SIDs match, the phone 12 knows that the cell it is communicating with is part of its home system.

c. Along with the SID, the phone 12 also transmits a registration request, and the MTSO 20 keeps track of the user's phone's location in a database. This way, the MTSO 20 knows which cell the user is in when it wants to ring the user's phone 12.

d. The MTSO 20 gets the call, and it tries to find the user. It 20 looks in its database to see which cell the phone 12 is in.

e. The MTSO 20 picks a frequency pair that the user's phone 12 will use in that cell to take the call.

f. The MTSO 20 communicates with the user's phone 12 over the control channel to tell it which frequencies to use, and once the user's phone 12 and the base station 18 switch on those frequencies, the call is connected. The user is talking by two-way radio to a friend.

As the user travels, the signal is passed from cell to cell.

SUMMARY

Accordingly, it is an object of this invention to provide a communication system that ceases communication to personal electronics in a predefined environment.

It is another object of this invention to provide a communication system that that continues to allow users to be reached in the case of an emergency, or otherwise.

It is still another object of this invention to provide communication system that does not require a user to disable their radio communication device.

The aforementioned and other objects are achieved by the invention which provides a communication system for isolating consumer and other electronics and a method associated therewith.

A communication system is disclosed for use with a radio communication device where an incoming signal alerts a user to a communication on the radio communication device. The communication system comprises a signal interference device, an antenna and a receiver.

The signal interference apparatus is adapted to interfere with the incoming signal and has a predetermined border outside of which the signal interference device's effects are nominal. In essence, the signal interference device creates a zone in which the radio communication device does not receive the original signal or, if received, the original signal is unintelligible. The signal interference apparatus, therefore, selectively interferes with predetermined radio frequencies or a spectrum of frequencies.

The antenna is disposed beyond the predetermined border of the signal interference device. Thus, the antenna is not materially affected by the interference of the signal interference apparatus.

The receiver is electrically connected to the antenna so that it receives the incoming signal. The receiver, in essence, intercepts the incoming signal. A Registrar then selectively tracks devices within the zone of the signal interference apparatus and parses out communications intended for those devices that have been registered.

Once intercepted, the signal intended for the registered devices are processed to create a message or redirect the message elsewhere. For example, if the incoming signal is a cellular phone call, the signal may be redirected to a landline. If the incoming signal is from a pager, it may be redirected to an email message. If the signal is not intended for a registered device, the registrar of this embodiment of the invention discards the signal.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of communication devices and may be embodied in several different forms, it is advantageously employed in connection with radio-frequency communication devices such as cellular telephones. Though this is the form of the exemplary embodiment and will be described as such, this embodiment should be considered illustrative and not restrictive. One skilled in the art will recognize that cellular telephones are simply one of many devices with which this invention may be used. Other devices in the non-exhaustive list comprise pagers, citizens band (CB) radios, AM/FM radios, wireless PDAs, wireless linked game units, and blue tooth devices. In addition, the invention is not frequency dependant, if the application so required, the invention is also useful with microwave radios, inter alia.

Figure 1:
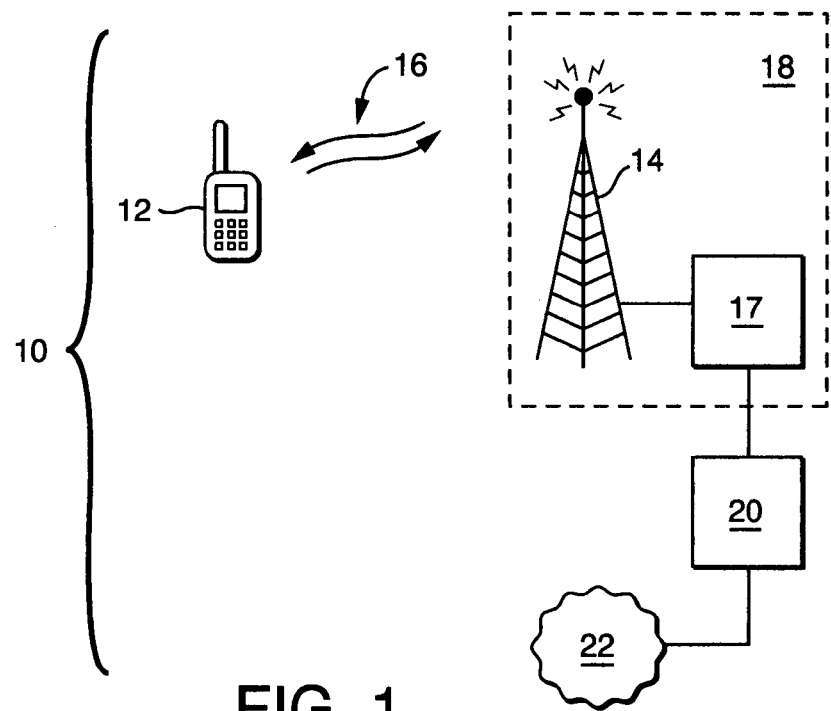
FIG. 1 shows a diagram of a prior art cellular telephone system.
Figure 2:
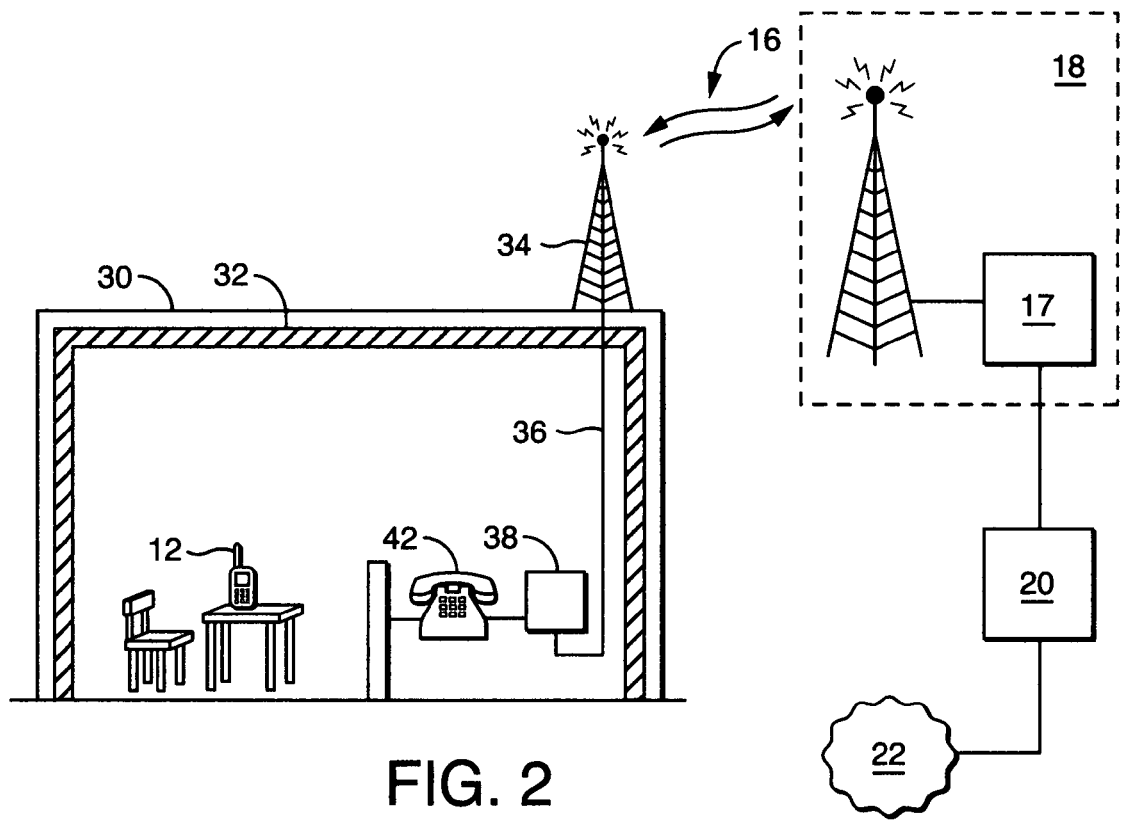
FIG. 2 shows a diagram of a structure isolated from radio communication in accordance with the invention.

FIG. 2 is a diagram of structure 30 isolated from radio communication. The structure 30 shown is an entire building, though it can be a room within a building or other defined area. Moreover, the structure need not be fixed. One skilled in the art will recognize that a mobile structure such as the housing of aircraft, an elevator, or an automobile, inter alia, can be similarly used. Thus, the structure 30 shown as a building should be considered illustrative and not restrictive.

The structure 30 is isolated from radio communication by a shield 32. The shield 32 insulates the structure 30 using any of various highly attenuating materials. Shielding can work both to prevent radio waves from radiating out or to prevent radio waves from getting in. The effectiveness of a shield is a function of the material, the frequency, the angle of incidence, coverage, and the thickness of the material. Metal is commonly used to shield radio waves. Plastic materials used as shields are coated or impregnated with reflective and adsorptive materials or have embedded screens.

The cell phone 12 is shown within the structure 30 and the structure is shown as a restaurant. As stated previously, the cell phone 12 can be any of various other radio device and the restaurant can be any of various other structures.

With the cell phone 12 disposed within the shield, communication waves 16 are attenuated prior to reaching the cell phone 12. As such, the phone does not ring when the base station 18 attempts to establish communication.

Instead, when a user wishes to be available for a call while in the structure 30, that user registers the phone with the registrar 38. The registrar 38 reads from the cell phone 12 its SID either directly from the phone 12 or as a result of user input from a console (not shown). The user input may be the cellular phone number and/or the cellular service used by the service, for example. Since cellular phone services are assigned blocks of phone numbers, the SID can be a database lookup using the cellular phone's number. This information then allows the registrar to look up in its database the control channel frequencies used by the cellular service.

Likewise, the phone 12 is queried or sufficient data is input for the registrar to determine the MIN and any other information needed to establish communication between the registrar 38 and the base station 18 such that the registrar can act as if it were the phone 12.

Once the registrar 38 knows the control channel(s), the registrar 38 receives radio 16 communication from an antenna 34 located outside of the shield 32. The antenna 34 is in electrical communication with the registrar 38 via a cable 36. One skilled in the art will recognize that the cable 36 can be replaced by wireless communication as long as both the transmitting antenna attached to the antenna 34 is located within the shield 32 as well as a receiving antenna attached to the registrar 38.

The registrar 38 then listens on the control frequency associated with that phone 12 for an incoming call, similarly to what the cell phone 12 itself would do if the phone 12 were outside the shield 32. Note that the registrar 38 of the invention is enabled to register multiple radio devices simultaneously and thus monitor multiple control channels.

If an incoming call is detected, the registrar 38 establishes contact over the control channel using the protocol expected by the base station 18. The MTSO 20 communicates with the registrar 38 over the control channel to tell the registrar 38 which frequencies to use. The registrar then switches to those frequencies to communicate with the base station 18 on those frequencies. This is performed transparently to the base station 18 since the registrar is performing as if the registrar 38 were the phone 12.

A telephone 42 connected to the registrar is then signaled and the call is connected. In the restaurant example, the host would be able to answer the phone 42 and take a message. In the registration process, the user can put table location information or receive a structure-dependant pager to receive messages. The host then delivers the message. The user steps to the lobby to use the phone 42 or to exit the structure to use his/her cell phone 12 to return the call, inter alai.

The registrar is enabled to communicate within private branch exchanges (PBX) or to simply forward calls to other phones. For example, if the structure 30 is a meeting room within a firm, the registrar 38 can be set up to send the call to the user's internal voice mail. The registrar can also be enabled to allow a caller to indicate that the call is urgent in which case the call is directed to a landline within the meeting room. Therefore, the actions performed upon the call upon receipt are programmable and selectable. The operator of the registrar 38 thus selects how the registrar will respond to calls of differing priority levels or to different registered users.

The registrar 38 is also enabled to accept voice messages. The user is then informed that a voice message is awaiting him/her, which can be collected at the cell phone user's convenience. The caller, upon being connected to voice mail, is presented the option of leaving the voice mail message and designating that the message is urgent or electing low priority, inter alia. If the message is urgent, the preprogrammed action sequence is executed. In the case of a restaurant, the host is usually notified and the host retrieves the user to take the call. In the case of a low priority call, the call is redirected to the voice mailbox associated with the user's cellular telephone account.

Figure 3:
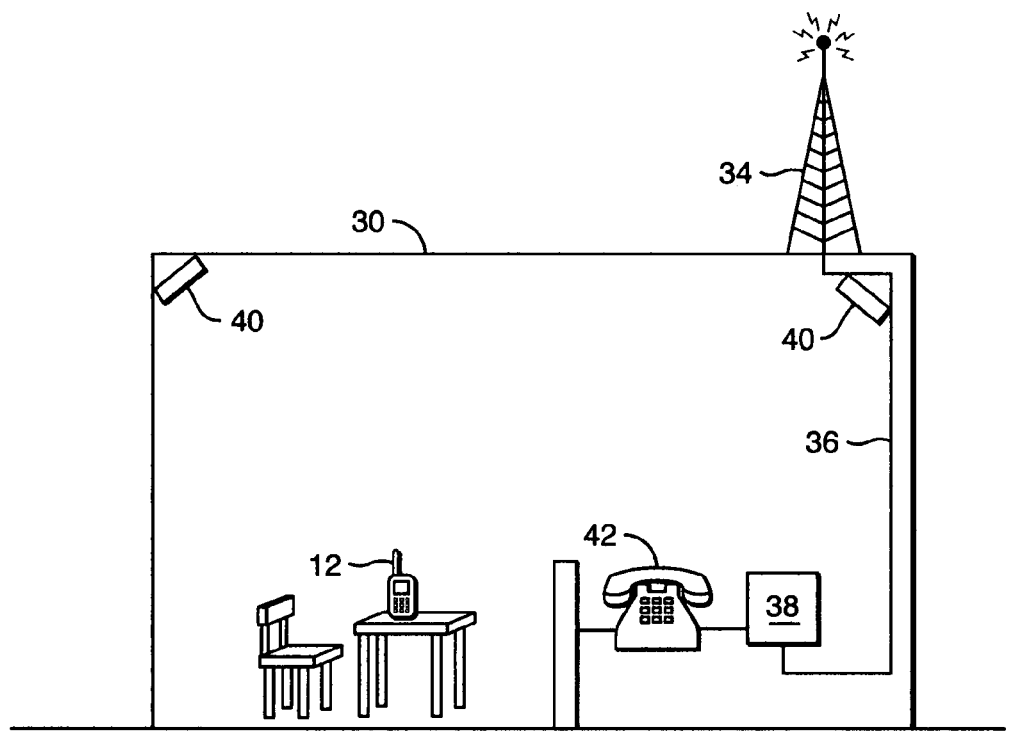
FIG. 3 shows a diagram of an alternative embodiment of a radio communication in accordance with the invention.

FIG. 3 shows a structure 30 equipped with destructive interference (DI) transmitters 40. The DI transmitters 40 are low-power radio-frequency transmitters designed to interfere with the radio devices within the structure, in this case the cell phone 12. DI transmitters 40 can be used instead of or in addition to the shield 32, depending upon the required system design characteristics.

The DI transmitters 40 can interfere with the cell phone reception in any of numerous ways. Those methods are more technology dependent and thus will again be described by way of example. The overall goal of the DI transmitters 40 is to create confusion within a received radio signal due to the presence of noise (as atmospherics) or signals from two or more transmitters on a single frequency.

The DI transmitters 40 of the instant invention utilize inter-modulation to interfere with the reception. Inter-modulation noise is caused by the blending of two or more signals. This is the "classic" form of noise in radio-frequency devices. Communication systems are ever evolving and, thus, the DI transmitters 40 must simply use a type of noise that is sufficient to interfere with the devices in question. The usual variables in creation of the noise are phase, frequency and amplitude, though other methods known in the art may be employed.

That is, there is no standard level of interference or a single formula that can be used to compute it. What constitutes interference in one system may be totally invisible or inconsequential in another. Thus the DI transmitters 40 designed for use with pagers may be different than that used with cellular telephones or walkie-talkies.

To understand interference within its unique environment, it can be defined in terms of its amplitude relationship to the amplitude of the desired or "carrier" signal. This relationship is known as a "carrier-to-interference ratio" (C/I).

Every communications receiver has a minimum carrier-to-interference ratio that must be maintained in order to recover 100% of the information from a desired signal. If this minimum ratio of signal over interference is not met, communications will be disrupted, and the system becomes unusable. The specific receiver C/I characteristics depend on the usable dynamic range of the receiver front-end, as well as the type of demodulator and modulation being employed.

One method that can be employed by the DI transmitters 40 is to create dynamic range problems. The DI transmitters 40 would do so by subjecting the cell phone 12 to RF overload. The RF overload occurs by placing a strong RF signal on the control frequencies known to the registrar 38. This requires the registrar's database to contain all control frequencies used by each carrier in the geographic area in which the registrar is used. The strong signal on the carrier channel causes inter-modulation distortion or degradation of the receiver's threshold sensitivity. In cases of inter-modulation distortion, inter-modulation products confuse the receiver's demodulator. In other words it is unable to discriminate between the "real" signal information and the "phantom" inter-modulation signal components, which results in garbage output.

In another embodiment, the DI transmitters 40 employ strong localized signals on the carrier channel to achieve receiver desensitization. The signals transmitted by the DI transmitters 40 are rectified by the receiver mixer diode junction(s), and the rectified DC voltage "pushes" the mixer's bias point away from the optimal operating point for signal mixing functionality. As a result, the mixer's weak signal performance is degraded, which decreases the receiver's sensitivity, or ability to "hear" signals of low amplitude.

In the alternative, the registrar can coordinate the destructive interference generated by the DI transmitters 40. Since the antenna 34 is receiving the control frequency, it can determine the control signal's phase and signal strength. The registrar 38 informs the DI transmitters 40 of the frequency and phase information. The DI transmitters 40 then transmits a signal within the structure 30 in the same or substantially similar frequency which adaptively matches amplitude proportionally to that of the signal strength, but 180 degrees out of phase from the control signal. This then negates the control signal to a point below the C/I threshold for the cell phone 12. This method is preferably used in conjunction with a shield 32 to avoid interference outside of the structure 30.

Another example among the many possible means of interference generation is to not shield the structure at all and let the control signal through. However, using the same method as described above, the DI transmitters 40 transmits a signal within the structure 30 in the same frequency and phase as the control signal. This then becomes an additive signal relationship where the amplitude is then used to overload the receivers input. This would exceed the receiver's ability to read the signal again creating a form of destructive interference within the cell phone 12.

The primary examples used above describe fixed-frequency interference. The DI transmitters 40 can also follow a control signal that is frequency hopping to create the interference described above simply by mimicking the hops as seen by the registrar 38. Each carrier's frequency hopping schemes are generally known in the industry and can be preprogrammed too.

Alternatively, the DI transmitters 40 can generate interference across a frequency spectrum. This method of interference generation addresses carriers that employ spread spectrum and also those utilizing multiple control channels in a given frequency band. One method of accomplishing this is for the DI transmitters 40 to generate their interference, or noise, with a wider bandwidth about a center frequency.

The foregoing describes a system where the user does not have control over the structure 30. There are instances however, where the user controls the structure and still elects to use the invention. In this case the invention is used to augment the radio signal 16. An example of such an environment if an automobile.

In a controlled environment, the cell phone 12 is registered with the registrar and then purposely disabled. This can occur through shielding and DI transmitters as previously described, or simply by the user turning off the power to the cell phone. If the registrar has a mating console on which the phone can rest, the console can operate with the phone to disable it.

Once off, the registrar 38 acts as the cell phone's surrogate. A call is received through a fixed antenna 34 on the outside of the car and transmitted internally. The registrar 38 is then connected to a speakerphone mounted within the car or through the car's audio system.

In the alternative, the registrar 38 interferes with the control signal until it 38 needs to make use of it. Once a call is received, the registrar 38 informs the cell phone 12 of an incoming call over the control channel as is typical, but chooses a frequency pair that differs from that which was chosen by the MTSO 20. The call is then retransmitted at an extremely low power within the structure 30 of the car and the cell phone 12 is used as designed. The retransmission method minimizes any possibility of outside noise while the low power transmission ensures that the registrar does not interfere with any user outside of the car on the same frequency pair.

The registrar 38 in either case has the advantage of using a stronger receiver wired directly to the car's electrical system and/or an external fixed antenna.

Figure 4:
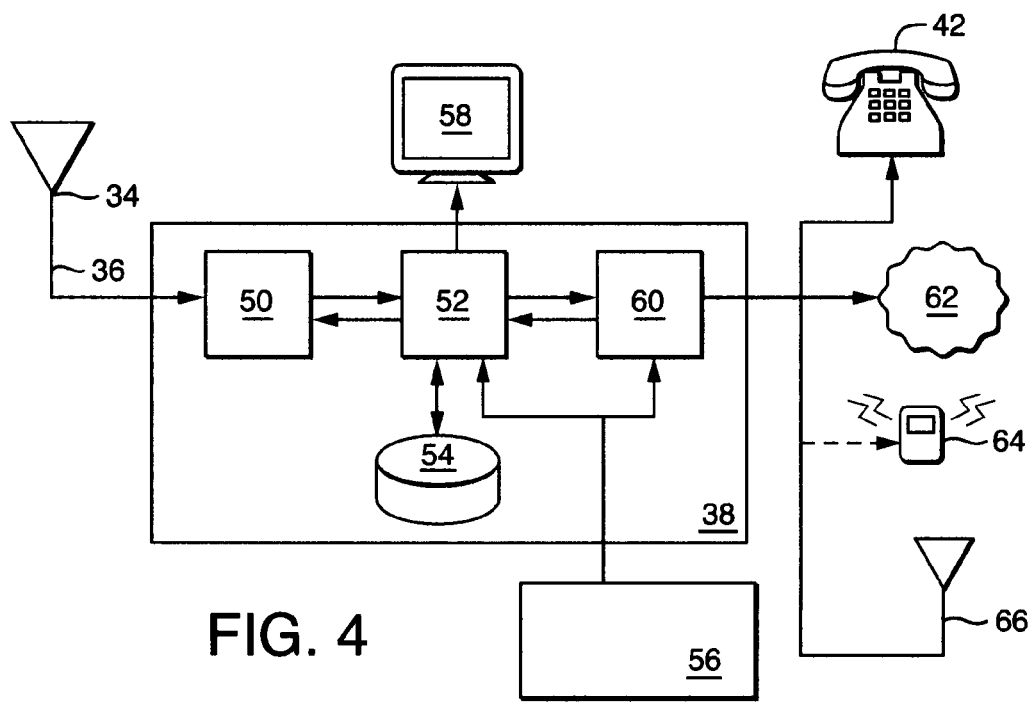
FIG. 4 shows a block diagram of a registrar in accordance with the invention of FIGS. 2 and 3.

FIG. 4 shows the elemental components of one embodiment of the registrar 38 and will be described with continuing reference to FIGS. 2 and 3. As before, the radio signal is taken from the antenna 34 through the cable 36 or other such signal transmission method.

The signal is then brought in to the registrar 38 through a receiver 50. The receiver is tuned to one or more frequency bands depending upon the application. In the foregoing implementation, the receiver is tuned to receive the control frequencies of the major cellular telephone carriers in the region where the registrar is located. Since there is generally one such channel per carrier, the receiver 50 is capable of receiving up to the number of licensed carriers in a region. However, in practice, the number of channels that the receiver 50 monitors is small since it will only try to monitor the control channels for those devices that have been registered. That is, even though the shield 32 and DI transmitter 40 interferes with many radio signals across a broad spectrum of radio frequencies, if the user does not register the radio device, i.e. the phone 12, then the registrar does not monitor that control channel. One skilled in the art will recognize that even if multiple users register radio devices that use the same commercial service provider, only one control channel associated with that commercial service provider need be monitored. However, in the event that a commercial service provider utilizes multiple control channels, the receiver 50 would simply monitor the multiple channels associated with that commercial service provider. In this embodiment, the maximum number of channels is sixty-four, though this is a design choice and can be varied.

For each control channel being monitored, the receiver 50 decodes the signal and passes the data to a processor 52. The processor 52 compares the data to the registration information stored in memory 54.

The memory 54 can be any of various volatile or non-volatile data storage devices including hard disks or solid state memory.

The processor 52 also stores in the memory 54 user-specific data for later retrieval. In this way, when the user returns to the structure 30 at a later date, the registration process is as easy as accessing the database entry for that user. The data can also be used for marketing activities.

The registration data, user-specific information and notification rules are all input through the console 56. The console 56 has a keyboard for alphanumeric input. In this embodiment, the console 56 has multiple data ports to mate with a wide variety of models of radio devices. For the radio devices that allow radio-frequency queries, the console 56 has a low-power transmitter/receiver to communicate directly with the radio device to interrogate it for registration information.

The processor 54 of this embodiment has a display 58 associated with it. The display provides real-time feedback to the operator and provides alerts as part of the notification system 60.

The notification system 60 is provided with notification option selections from the console 56 and/or the processor 54. Once an incoming signal is received in the receiver 50 and the processor 52 determines that the incoming signal is intended for a registered user, the processor signals the notification system 60.

The notification system 60 then alerts the user, the operator or both, depending upon which selections were made during registration. As previously described, the notification system 60 can simply actuate a dedicated telephone 42. Another option would be to send notification through an external network 62, such as the telephone network (POTS), a PBX, or the Internet for example. The message can be audio, video, text or a combination of those, again depending purely upon design and implementation.

In other implementations, the notification system 60 can operate with dedicated wireless pagers 64 that vibrate and/or flash a light upon notification.

Finally, the notification system 60 can send a radio frequency signal through its own transmitter/antenna 66. One use of this feature would be to further boost and clarify a signal within a structure 30. One example of this would be in an office where use of cellular telephones and pagers is encouraged, a sales office for example. Many buildings already attenuate radio signals without any additional shielding simply due to their metal framework. Re-transmitting the incoming signal internally would enhance call quality.

The invention may be embodied in other specific forms without departing from the spirit or essential characteristics The embodiments of the invention in which an exclusive property or privilege is claimed are defined as follows:

1. A communication system for use with a radio communications network broadcasting to a plurality of radio communication devices where incoming signals from the radio communication network alert users to communications on the radio communication devices, the communication system comprising:
   a signal interference apparatus adapted to interfere with the incoming signals from the radio communications network and having a predetermined border outside of which the effects of the signal interference apparatus are too small to cause non-operation of said radio communication devices;
   an antenna, separate from both the radio communications network and the radio communication devices, and disposed beyond the predetermined border of the signal interference apparatus; and
   a receiver, separate from both the radio communications network and the radio communication devices, in electrical communication with the antenna adapted to receive the incoming signals from the radio communication network and to divert the incoming signals from the radio communication network to a device other than the radio communication devices and other than voice mailboxes associated with the radio communication devices, when the radio communication devices are located within the predetermined border but not when the radio communication devices are located outside the predetermined border.

2. The communication system according to claim 1 wherein the signal interference apparatus selectively interferes with predetermined radio frequencies.

3. The communication system according to claim 1 wherein the signal interference apparatus is a mechanical shield adapted to attenuate the incoming signal.

4. The communication system according to claim 1 wherein the signal interference apparatus mimics an amplitude and frequency of one of the incoming signals while phase shifting one hundred eighty degrees to destructively interfere with that incoming signal.

5. The communication system according to claim 1 wherein the signal interference apparatus mimics frequency of and a phase 180 degrees relative to one of the incoming signals while boosting amplitude beyond a known limit to destructively interfere with that incoming signal.

6. The communication system according to claim 1 further comprising a registrar in communication with a cellular base station, the registrar being adapted to accept external input to register the radio communication devices by receiving identification information relating to the radio communication devices, and thereafter to monitor multiple control channels, each control channel associated with one or more registered radio communication devices so that the registrar can act as the registered radio communication devices by intercepting calls intended for the registered radio communication devices when the registered radio communication devices are located within the predetermined border.

7. The communication system according to claim 6 wherein the registrar is selective as to action sequences upon receipt of communication.

8. The communication system according to claim 1 further comprising a notification system adapted to generate a notification of an incoming communication.

9. The communication system according to claim 8 wherein the notification system is adapted to communicate with an external telephone system.

10. The communication system according to claim 9 wherein the external telephone system is a PBX.

11. The communication system according to claim 6 wherein the registrar is selective as to action sequences upon receipt of communication.

12. The communication system according to claim 1 wherein the receiver intercepts the incoming signal and transmits a second incoming signal to the radio communication device on a frequency that differs from that of the incoming signal.

13. A destructive interference generator for use with a plurality of cellular radio communication devices that communicates over multiple frequency channels, the destructive interference generator comprising: a registrar adapted to monitor multiple control channels simultaneously, each control channel associated with one or more radio frequency and phase information of an incoming cellular radio signal intended for one of the radio communication devices; a receiver, separate from the cellular radio communication devices, and adapted to receive the coordinating information; and a radio frequency transmitter adapted to transmit an interference signal in response to the coordinating information and having a similar frequency to the frequency of the incoming cellular radio signal.

14. The destructive interference generator according to claim 13 wherein the interference signal mimics an amplitude and frequency of the incoming cellular radio signal while phase shifting one hundred eighty degrees to destructively interfere with the incoming cellular radio signal.

15. The destructive interference generator according to claim 13 wherein the interference signal mimics frequency of the incoming cellular radio signal while boosting amplitude beyond a known limit to destructively interfere with the incoming cellular radio signal.

16. The destructive interference generator according to claim 13 wherein the interference signal utilizes localized signals on the carrier channel to achieve receiver desensitization.

17. A method for intercepting a wireless radio signal broadcast from a radio communication network and intended for a first communication device, and communicating the wireless radio signal to a second communication device without using the radio communication network, the method comprising: interfering with the wireless radio signal from the radio communication network within a predetermined zone; intercepting the wireless radio signal from the radio communication network outside of the predetermined zone to create an intercepted signal; and transmitting the intercepted signal to the second communication device instead of the first communication device without using the radio communication network.

18. The method according to claim 17 wherein the step of interfering with the radio signal is accomplished using a destructive interference transmitter.

19. The method according to claim 17 wherein the step of interfering with the radio signal is accomplished using a radio frequency shield.

* * * * *